3,716,559
4-METHYLEN-2-OXA-3-KETO ANDROSTANES AND 4-METHYL-Δ⁴ DERIVATIVES THEREOF

Robert J. Chorvat, Arlington Heights, and Raphael Pappo, Skokie, Ill., assignors to G. D. Searle & Co., Chicago, Ill.
No Drawing. Filed July 13, 1971, Ser. No. 162,294
Int. Cl. C07d 7/18
U.S. Cl. 260—343.2 S    6 Claims

ABSTRACT OF THE DISCLOSURE

The reaction of 2-oxa-3-keto androstanes with formaldehyde affords the corresponding 4-methylene derivatives, which are rearranged by treatment with palladium catalyst to afford the corresponding 4-methyl-Δ⁴ derivatives. Both the 4-methylene and 4-methyl-Δ⁴ compounds are pharmacologically active as is evidenced by their anabolic and androgenic properties.

---

The present invention concerns 4-methylene and 4-methyl-Δ⁴ steroidal derivatives represented by the following structural formulas

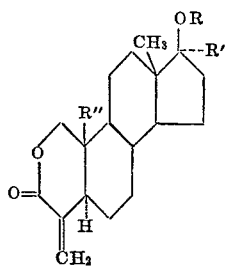

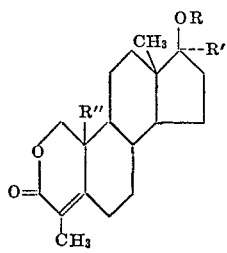

wherein R is hydrogen or a lower alkanoyl radical, R' is hydrogen or a lower alkyl radical, and R" is hydrogen or a methyl radical.

The lower alkanoyl radicals encompassed by the R term are typified by formyl, acetyl, propionyl, butyryl, valeryl, caproyl, heptanoyl and the branched-chain radicals thereof.

Representative of the lower alkyl radicals denoted by the R' term are methyl, ethyl, propyl, butyl, pentyl, hexyl, heptyl and the corresponding branched-chain isomers.

The 4-methylene derivatives of this invention are suitably prepared by reaction of the corresponding 2-oxa-3-keto materials with formaldehyde, preferably in the presence of a suitable alkaline catalyst. That process is specifically illustrated by the reaction of 17β-hydroxy-2-oxa-5α-androstan-3-one with 36–38% aqueous formaldehyde and potassium carbonate to afford 17β-hydroxy-4-methylen-2-oxa-5α-androstan-3-one. Similarly, the reaction of 17β-hydroxy-2-oxa-5α-estran-3-one with those reagents affords 17β-hydroxy-4-methylen-2-oxa-5α-estran-3-one.

Rearrangement of the instant 4-methylene compounds is effected by treatment with a suitable catalyst such as palladium. In that manner, the 17β-hydroxy-17α-methyl-4-methylen-2-oxa-5α-androstan-3-one is treated with 5% palladium on carbon to yield 17β-hydroxy-4,17α-dimethyl-2-oxaandrost-4-en-3-one.

Reaction of the instant 17-hydroxy compounds with a lower alkanoic acid anhydride or halide, preferably in the presence of a suitable acid acceptor, results in the corresponding 17-(lower alkanoates). A specific example of that process is the reaction of 17β-hydroxy-4-methylen-2-oxa-5α-androstan-3-one with acetic anhydride and pyridine, thus affording the corresponding 17-acetate. When the 17-hydroxy group is tertiary, as in 17β-hydroxy-17α-methyl-4-methylen-2-oxa-5α-androstan-3-one, for example, the acylation is preferably conducted by using an isopropenyl alkanoate in the presence of an acid catalyst. The reaction of the latter lactone, for example, with isopropenyl acetate and p-toluenesulfonic acid yields 17β-acetoxy-17α-methyl-4-methylen-2-oxa-5α-androstan-3-one.

The compounds of the present invention are useful as pharmacological agents, particularly in view of their anabolic and androgenic properties. The anabolic and androgenic properties of those compounds is apparent from their activity in the assays described in U.S. Pat. 3,501,504, issued Mar. 17, 1970.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

A solution containing 7 parts of 17β-hydroxy-2-oxa-5α-androstan-3-one, 100 parts by volume of 36–38% aqueous formaldehyde, 0.8 part of ethanol and 10–15 parts of potassium carbonate is heated at the reflux temperature under nitrogen for between 4 and 8 days. At the end of that time the reaction mixture is acidified by the addition of dilute hydrochloric acid and the precipitate which forms is collected by filtration. The aqueous filtrate is extracted several times with chloroform and that organic extract is washed with water, dried over anhydrous sodium sulfate and stripped of solvent under reduced pressure. The resulting solid residue is combined with the aforementioned precipitate and that crude product is purified by chromatography on silicic acid, using a 1:1 chloroform-benzene mixture containing increasing amounts of ethyl acetate as the eluant. The pure product is eluted by use of the 2% ethyl acetate eluant and is further purified by recrystallization from aqueous ethanol to yield pure 17β-hydroxy - 4 - methylen - 2 - oxa - 5α-androstan-3-one, melting at about 202–203.5° and represented by the following structural formula

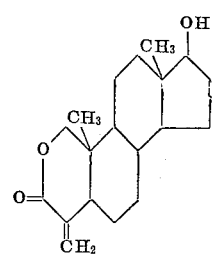

It is further characterized by infrared absorption peaks in chloroform, at about 2.77, 5.80 and 6.15 microns and nuclear magnetic resonance maxima in deuteriochloroform at about 46, 56, 220, 235, 245, 253, 264, 332 and 390 Hertz.

EXAMPLE 2

To a mixture of 6.35 parts of 17β-hydroxy-17α-methylyl-2-oxa-5α-androstan-3-one and 50 parts by volume of 36–38% aqueous formaldehyde is added 25 parts by volume of N-methylpiperidine and the resulting solution is heated at reflux temperature in a nitrogen atmosphere for between 4 and 6 days. The reaction mixture is then cooled and diluted with approximately 100 parts of water. The precipitate which forms is collected by filtration and dried, thus affording the crude product. Purification of that crude material is effected by chromatography on a silicic acid column followed by elution with 2% ethyl acetate in a 1:1 mixture of chloroform and benzene followed by recrystallization from ethanol. That pure substance, i.e. 17β - hydroxy - 17α - methyl - 4 - methylen-2-oxa-5α-androstan-3-one, melts at about 216.5–218° and is represented by the following structural formula

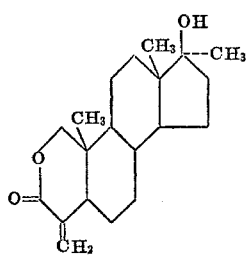

In chloroform infrared maxima are observed at about 2.77, 5.82 and 6.15 microns. Nuclear magnetic resonance peaks appear, in deuteriochloroform, at about 53, 56, 74, 235, 246, 253, 264, 332 and 390 Hertz.

EXAMPLE 3

When an equivalent quantity of 17α-ethyl-17β-hydroxy-2 - oxa - 5α - androstan-3-one is substituted in the procedure of Example 2, there is obtained 17α-ethyl-17β-hydroxy-4-methylen-2-oxa-3-one.

EXAMPLE 4

A mixture containing 1 part of 17β-hydroxy-4-methylen-2-oxa-5α-androstan-3-one, 10 parts of acetic anhydride and 20 parts of pyridine is allowed to stand at room temperature for about 16 hours, then is poured carefully into a large volume of water. The resulting aqueous mixture is extracted with benzene and the benzene layer is separated, dried over anhydrous sodium sulfate, then stripped of solvent under reduced pressure, thus affording 17β-acetoxy - 4 - methylen - 2 - oxa-5α-androstan-3-one.

EXAMPLE 5

A mixture containing 1 part of 17β-hydroxy-17α-methyl - 4 - methylen - 2 - oxa-5α-androstan-3-one, 20 parts of isopropenyl acetate and 0.02 part of p-toluenesulfonic acid monohydrate is heated at reflux temperature for about 2 hours then is cooled and diluted with benzene. The organic solution is washed with aqueous potassium bicarbonate, dried over anhydrous sodium sulfate and concentrated to dryness under reduced pressure, thus producing 17β-actoxy-17α-methyl-4-methylen-2-oxa-5-androstan-3-one.

EXAMPLE 6

To a solution containing 2.7 parts of 17β-hydroxy-4-methylen - 2 - oxa - 5α-androstan-3-one in 40 parts of ethanol is added successively 1 part of 5% palladium-on-carbon and 2 parts of sodium acetate. The resulting reaction mixture is heated at the reflux temperature in a nitrogen atmosphere for about 3 hours, then is concentrated to about ½ volume. Water is then added to that mixture with heating and the crystalline product separates upon cooling, thus affording 17β - hydroxy - 4-methyl-2-oxaandrost-4-en-3-one, melting at about 196.5–198°. This compound is represented by the following structural formula

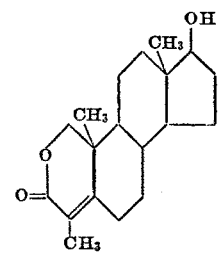

It displays infrared absorption maxima in chloroform, at about 2.79, 5.90 and 6.15 microns and nuclear magnetic resonance peaks in deuteriochloroform at about 47, 72, 112, 219, 229, 240, 248 and 259 Hertz. An ultraviolet absorption maximum is observed in methanol at about 232 millimicrons with a molecular extinction coefficient of about 12,800.

EXAMPLE 7

When an equivalent quantity of 17β-hydroxy-17α-methyl-4-methylen-2-oxa-5α-androstan-3-one is substituted in the procedure of Example 6, there is produced 17β-hydroxy - 4,17α - dimethylandrost - 4 - en-3-one, melting at about 176.5–177.5° and represented by the following structural formula

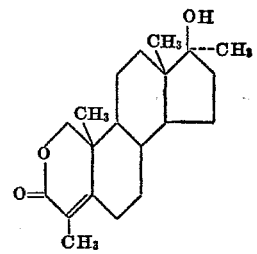

This compound exhibits an ultraviolet absorption peak, in methanol, of about 232 millimicrons with a molecular extinction coefficient of about 12,200 infrared absorption maxima, in chloroform, at about 2.78, 5.85 and 6.13 microns and nuclear magnetic resonance peaks, in deuteriochloroform, at about 53, 72, 112, 229, 240, 247 and 258 Hertz.

EXAMPLE 8

The substitution of an equivalent quantity of propionic anhydride in the procedure of Example 4 results in 4-methylen-2-oxa-17β-propionoxy-5α-androstan-3-one.

What is claimed is:
1. A compound of the formula

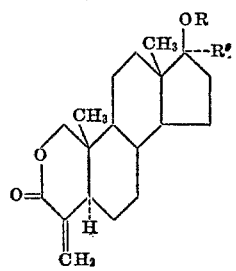

wherein R is hydrogen or a lower alkanoyl radical and R' is hydrogen or a lower alkyl radical.

2. As in claim 1, a compound of the formula

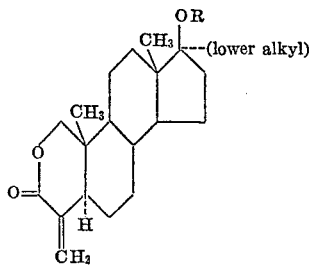

wherein R is hydrogen or a lower alkanoyl radical.

3. As in claim 1, a compound of the formula

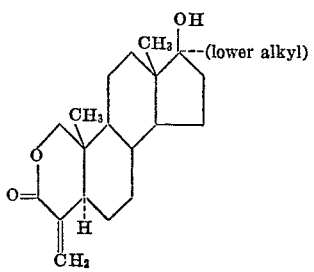

4. As in claim 1 a compound of the formula

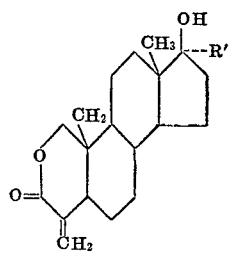

wherein R' is hydrogen or a lower alkyl radical.

5. As in claim 1, the compound which is 17β-hydroxy-4-methylen-2-oxa-5α-androstan-3-one.

6. As in claim 1, the compound which is 17β-hydroxy-17α-methyl-4-methylen-2-oxa-5α-androstan-3-one.

References Cited

UNITED STATES PATENTS 3,574,688   4/1971   Bucourt et al. _____ 260—343.2

JOHN M. FORD, Primary Examiner

U.S. Cl. X.R.

424—283